United States Patent Office 3,846,299
Patented Nov. 5, 1974

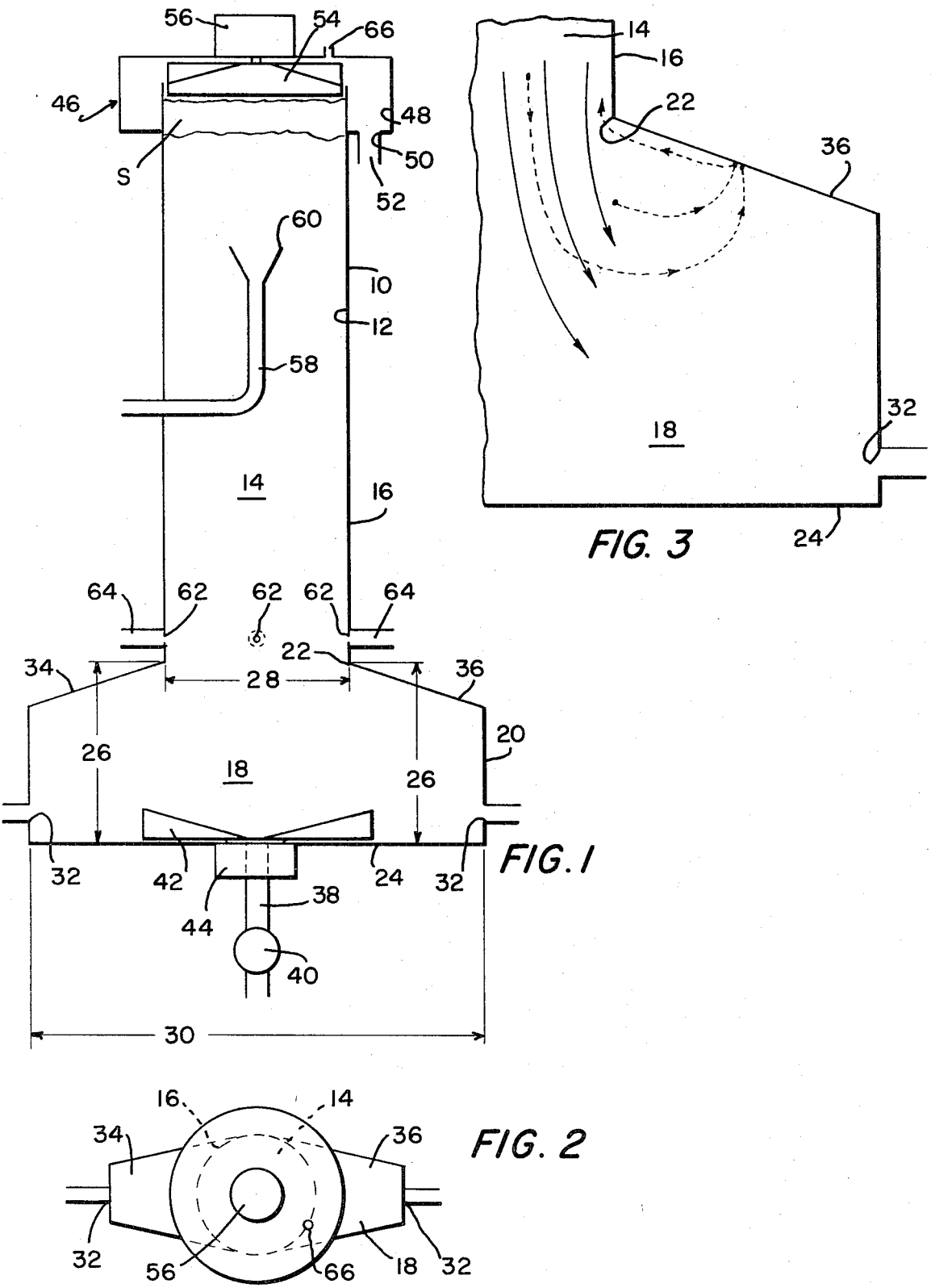

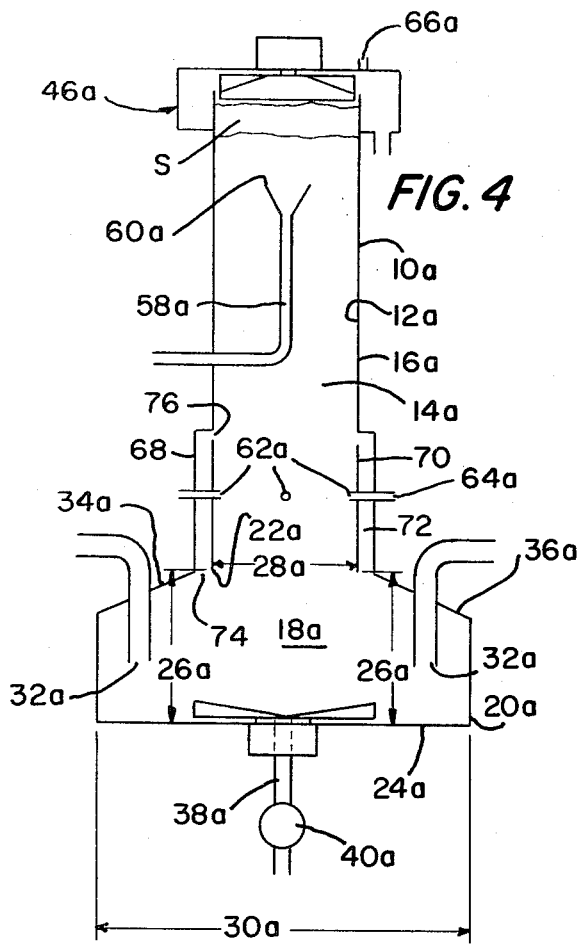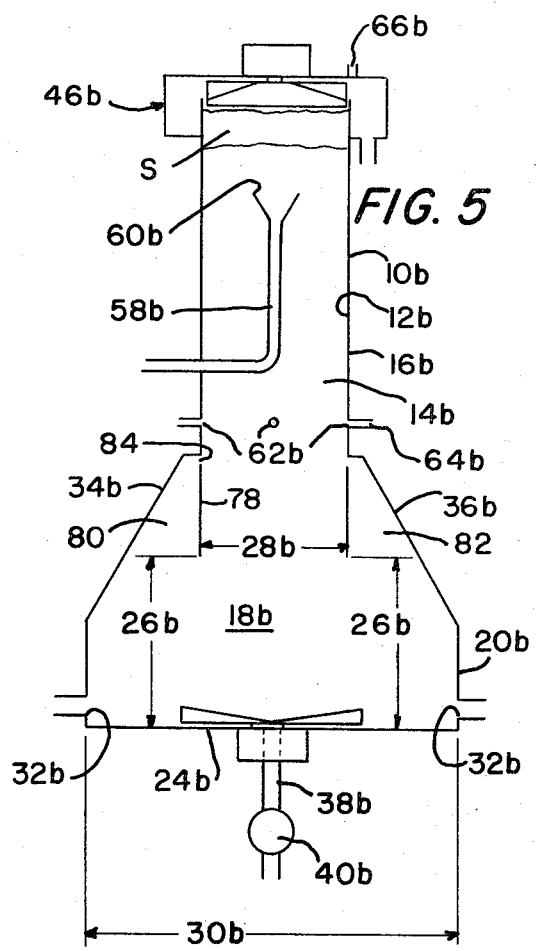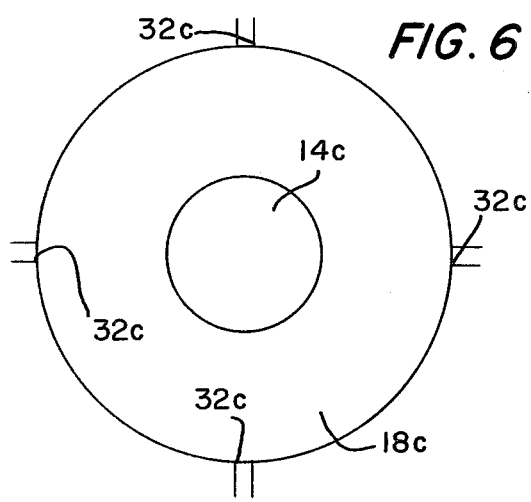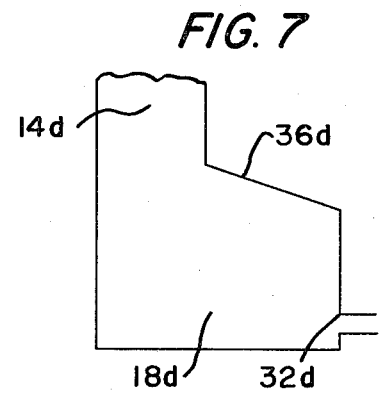

3,846,299
CLARIFYING APPARATUS AND METHOD FOR INFLUENT WATERS
Eugene L. Krasnoff, Princeton, N.J., assignor to Improved Machinery Inc., Nashua, N.H.
Filed Dec. 13, 1972, Ser. No. 314,796
Int. Cl. B03d 1/00
U.S. Cl. 210—44                                17 Claims

ABSTRACT OF THE DISCLOSURE

Apparatus and methods for clarifying an influent water (for example, sewage and other solid/liquid slurries) by gas stimulated flotation of solid material, wherein the clarifying chamber includes a first or upper portion and a larger transverse dimension, second or lower portion connected to the lower end of the chamber upper portion. At its upper end, the chamber lower portion progressively downwardly increases in transverse dimension; and the clarified liquid is discharged from the chamber lower portion at a location spaced outwardly of at least one side of the lower end of the chamber upper portion, the disclosed arrangement increasing the clarifying efficiency by facilitating rising or buoyant solid material and bubbles of the gaseous flotation medium in the chamber lower portion to the chamber upper portion.

---

The present invention relates generally to apparatus and methods for clarifying an influent water such as sewage and other solid/liquid slurries and more particularly to apparatus and methods wherein an influent water is clarified by gas stimulated flotation of solid material in the influent water.

Conventional, commercially available, apparatus and methods of this type, generally considered, are inefficient in that they discharge treated liquid or effluent which contains an undesirably large suspended solids content and is accompanied by an undesirably large volume of the flotation stimulating gas. As a result, such conventional apparatus and methods have been greatly limited in application and, in fact, have been primarily employed for further concentrating influent water solids, for example, those discharged by settling clarifiers.

An object of the present invention is to provide new and improved apparatus and methods particularly adapted for providing more efficient clarification of influent water by gas stimulated flotation of solid material in the influent water.

Another object of the invention is to provide new and improved apparatus and methods of the type set forth particularly adapted for operation at high throughput per unit of cross-section of the clarifying chamber.

Another object is to provide new and improved apparatus and methods of the type set forth particularly adapted for providing high quality, clarified liquid or effluent.

Another object is to provide new and improved apparatus and methods of the type set forth particularly adapted for substantially minimizing the volume of the gaseous flotation medium discharged with the clarified liquid.

Other objects and advantages of the invention will be apparent from the following description taken in connection with the accompanying drawings wherein, as will be understood, the preferred embodiments of the invention have been given by way of illustration only.

In accordance with the present invention, apparatus for clarifying an influent water may comprise a vessel containing a clarifying chamber including a first portion and a second portion adjacent the lower end of said first portion, said chamber second portion communicating with such lower end of said chamber first portion and said chamber second portion in at least one transverse direction being of greater dimension than such lower end and projecting laterally outwardly of at least one side of such lower end, influent water supply means operatively associated with said chamber first portion for supplying an influent water thereto at a location spaced above such lower end thereof, solid material discharge means operatively associated with said chamber first portion for discharging solid material from adjacent the upper end thereof, liquid discharge means operatively associated with said chamber second portion for discharging liquid from said chamber second portion at a location spaced outwardly of at least such one side of such lower end of said chamber first portion whereby liquid passing downwardly through such lower end flows outwardly in said chamber second portion to said liquid discharge means, gas supply means operatively associated with said clarifying chamber for supplying gaseous bubbles thereto at a location spaced vertically between said influent water supply means and said liquid discharge means, whereby such gaseous bubbles rise in said clarifying chamber to effect flotation of solid material to said solid material discharge means, and wall means overlying said chamber second portion laterally outwardly of such lower end of said chamber first portion for directing rising gaseous bubbles and buoyant solid material in said chamber second portion towards said chamber first portions for such flotation.

Also, in accordance with the invention, an influent water may be clarified by a method which may comprise the steps of supplying the influent water into a clarifying chamber at a location spaced above the lower end of said clarifying chamber, supplying gaseous bubbles into said clarifying chamber at a second location spaced below said supply of the influent water, permitting the supplied gaseous bubbles to rise in said clarifying chamber and effect flotation of solid material in the supplied influent water while permitting liquid in such influent water to flow downwardly in said clarifying chamber below said supply of said gaseous bubbles, causing such downwardly flowing liquid to flow outwardly and the velocity of the flow of such liquid to be reduced, whereby gaseous bubbles and buoyant solid material accompanying such outwardly flowing liquid are caused to rise in the clarifying chamber for said flotation, discharging such outwardly flowing liquid from said clarifying chamber below said supply of the gaseous bubbles and at a location spaced outwardly of the downward flow of liquid in said clarifying chamber above said supply of the gaseous bubbles, and discharging the flotation separated solid material from said clarifying chamber above said supply of the influent water.

Referring to the drawings:

FIG. 1 is an elevational view schematically illustrating an apparatus constructed in accordance with one embodiment of the invention;

FIG. 2 is a reduced size, top or plan view of the apparatus shown in FIG. 1;

FIG. 3 is a substantially enlarged, fragmentary, elevational view of the lower portion of the clarifying chamber of the FIG. 1 apparatus, wherein the flows in such chamber lower portion have been schematically shown;

FIG. 4 is an elevational view schematically illustrating an apparatus constructed in accordance with a second embodiment of the invention;

FIG. 5 is an elevational view schematically illustrating an apparatus constructed in accordance with a third embodiment of the invention;

FIG. 6 is a top or plan view schematically illustrating an apparatus constructed in accordance with a fourth embodiment of the invention; and FIG. 7 is an elevational view schematically illustrating an apparatus constructed in accordance with a fifth embodiment of the invention.

Referring more particularly to the drawings wherein similar reference characters designate corresponding parts throughout the several views, FIGS. 1 through 3 illustrate a clarifying apparatus comprising a vessel 10 containing a vertically elongated clarifying chamber 12 which, in accordance with the invention, is particularly constructed and arranged to maximize the clarifying efficiency of the apparatus 10 by substantially minimizing both the solids content of the discharged clarified liquid and the volume of the therewith discharged gaseous flotation medium. As illustrated, the clarifying chamber 12 includes a first or upper portion 14, contained within an annular vessel wall 16, and a second or lower portion 18, contained within the base or lower end 20 of the vessel 10, which is immediately below the cylindrical, open lower end 22 of the chamber portion 14 and entirely open to communication with such lower end 22. The chamber portions 14, 18, as will be noted, do not contain any transversely extending screens or fill and hence are free of transversely extending separating media such as would undesirably interfere with the hereinafter described flows therethrough.

The chamber lower portion 18 in a single horizontal or transverse direction is of transverse dimension 30 substantially greater than the diameter 28 of the lower end 22 of the chamber upper portion 14. Also, the lower end 22 is spaced above the bottom wall 24 of the chamber lower portion 18 (and, hence above the lower end of the chamber lower portion 18) a vertical distance 26 sufficient that the sum of the areas of the sections of the chamber lower portion 18 immediately below each of opposite sides of the lower end 22, in a direction crosswise to said transverse direction, and hence cross-wise to the flow liquid through the chamber lower portion 18 to the outlets 32, is substantially greater than the area of the lower end 22. The chamber lower portion 18 substantially projects laterally outwardly of two opposite sides of the lower end 22; and, adjacent the bottom wall 24 outwardly of each of such opposite sides of the lower end 22, the periphery of the chamber lower portion 18 is provided with a liquid discharge outlet 32. Hence, as will be seen, the discharge outlets 32 are arranged to discharge liquid from the lower end of the chamber lower portion 18 at locations spaced outwardly of, and on opposite sides of, the thereabove lower end 22.

The upper end of the chamber lower portion 18 is bounded by vessel walls 34, 36, connected to the lower end of the annular wall 16, which extend downwardly and outardly from opposite sides of the wall 16 to cause the upper end of the chamber lower portion 18 to progressively downwardly increase in horizontal or transverse dimension as it extends outwardly of the opposite sides of the lower end 22, the chamber lower portion 18 adjacent each of such walls 34, 36 being open to unobstructed communication with the lower end 22 whereby gaseous bubbles and accompanying buoyant solid material in the chamber lower portion 18 may rise inwardly along the lower surfaces of the walls 34, 36 through the lower end 22 into the chamber upper portion 14. The lower end of the chamber lower portion 18 is provided with a settleable solids discharge outlet connected to a discharge conduit 38, having therein a conventional trash pump 40, and contains a rotary bottom scraper 42 driven by a motor 44.

A solid material or sludge discharge means, designated generally as 46, is operatively associated with the upper end of the chamber upper portion 14 for discharging separated solid material therefrom. As illustrated, the solid material discharge means 46 comprises an annular circumferential discharge chamber 48, provided with a discharge outlet 50 connected to a discharge conduit 52, which is open to the upper end of the chamber upper portion 14, and a rotary top scraper 54 which is rotatably driven by a motor 56. Alternatively, however, as will be understood the solid material discharge means could be adapted for pressurized discharge of solid material from the upper end of the chamber upper portion 14.

The influent water supply means of the apparatus 10 comprises an influent water supply conduit 58, communicating with a source (not shown) of the influent water, which projects into the chamber upper portion 14 intermediate the ends thereof and then upwardly extends generally centrally of the chamber upper portion 14. The upper end of the conduit 58 terminates in an upwardly facing diffuser nozzle 60 which is generally centrally of the chamber upper portion 14 and at a vertical location or elevation substantially spaced above the lower end 22 and spaced below the upper end of the chamber upper portion 14. Alternatively, however, the influent water supply means could be otherwise suitably constructed to cause diffusion of the supplied influent water and distribution of the latter over the cross-section of the chamber upper portion 14 in a manner permitting optimum flocculation.

The gas supply means of the apparatus 10 comprises bubble producing nozzles 62 which, as illustrated, are spaced around the periphery of the chamber upper portion 14 at a vertical location or elevation adjacent, and above, the lower end 22. The nozzles 62 are each sized to produce gaseous bubbles of not greater than a maximum of 100 micron diameter and typically substantially less than 100 micron diameter and the nozzles 62 are arranged to discharge the gaseous bubbles into the chamber upper portion 14 in a direction generally transversely or radially of the chamber upper portion 14. The nozzles 62 are connected through individual supply conduits 64 to a common header (not shown) which is, in turn, connected to a source of a mixture of air (or other gas) and carrier liquid the liquid component of such gaseous/liquid mixture being for example, clarified liquid discharged from the chamber lower portion 18 through the outlets 32; and the nozzles 62 resultantly discharge the gaseous bubbles into the chamber portion 14 intermixed with carrier liquid which may be liquid previously clarified by the apparatus 10. A gas vent 66 is operatively associated with the upper end of the chamber upper portion 14 for exhausting gas from such upper end.

During the operation of the apparatus 10, the influent water to be clarified is continuously generally upwardly supplied into the chamber upper portion 14 through the conduit 58 and diffuser nozzle 60 while simultaneously gaseous bubbles (for example, air bubbles) are continuously supplied through the nozzles 62 into the chamber upper portion 14 intermixed with carrier liquid. The scale and intensity of the fluid turbulence in the region of the nozzle 60 are controlled to provide good flocculation and bubble attachment conditions. The supplied gaseous bubbles come out of mixture at the locations of their injection into the chamber upper portion 14 whereupon most of the bubbles cooperate to form a rising cloud of fine gas bubbles extending completely across the cross-section of the chamber upper portion 14, while the accompanying carrier liquid passes downwardly to the outlet 32. The rising cloud of fine air bubbles effects flotation separation of particles of solid material from the influent water, the flotation separated particles rising to the upper end of the chamber upper portion 14 to form a sludge blanket "S" discharged from such upper end by the discharge means 46. The liquid component of the influent water, and any accompanying particles of solid material which are not flocculated adjacent the upper end of the chamber upper portion 14, flow downwardly in the chamber upper portion 14 countercurrent to the rising cloud of gaseous bubbles through the interstices or tortous passageways between the individual bubbles of the cloud. During this downward flow, the rising bubbles, of course, effect flotation separation of additional particles of solid material, other than heavy settleable solids which are, of course, discharged from the lower end of the chamber lower portion 18 through the conduit 38.

The downwardly flowing liquid, together with any remaining accompanying gaseous bubbles and any remaning solid material, flow downwardly through the lower end 22 of the chamber upper portion 14 into the chamber lower portion 18 where, due to the enlarged transverse dimension of the chamber lower portion 18 and the arrangement of the outlets 32, they are caused to flow laterally outwardly. Due to the beforedescribed relationship between the areas of the lower end 22 and the sections of the chamber second portion 18 immediately below opposite sides thereof, the velocity of this outwardly flowing liquid and accompanying gaseous bubbles and solid material is substantially reduced, in the chamber lower portion 18, thereby permitting the gaseous bubbles and bouyant particles of solid material entrained within the flow to rise to the lower surfaces of the walls 34, 36. The walls 34, 36 direct such gaseous bubbles and solid material back through the lower end 22 into the chamber upper portion 14 whereupon such solid material is floated to the sludge "S" and the recovered excess gaseous bubbles effect flotation of solid material in the chamber upper portion 14. The clarified liquid flows from the chamber portion 18 through the outlets 32, the described flows in the chamber portion 18 being schematically depicted in FIG. 3 wherein the downwardly flowing liquid is shown by solid arrows and the rising gaseous bubbles and solid material are illustrated by broken arrows.

FIG. 4, wherein parts corresponding to those beforedescribed are designated by the similar reference numeral followed by the suffix a, schematically depicts a clarifying apparatus representing an alternative embodiment of the invention. The apparatus of FIG. 4 is different from the apparatus of FIG. 1 primarily in that provision is made for reintroducing gaseous bubbles and solid material recovered in the chamber lower portion 18a into the chamber upper portion 14a intermediate the upper and lower ends of the later. More specifically, as illustrated, an annular wall 68 surrounds the annular wall 70 peripherally defining the lower end of the chamber upper portion 14a, the annular wall 68 being radially spaced from the wall 70 by a therebetween annular chamber 72 which at its lower end 74 at least partially extends around the chamber lower end 22a and is open to the upper end of the chamber lower portion 18a. At its upper end, the annular chamber 72 communicates through a plurality of openings 76, spaced around the periphery of the chamber upper portion 14a, with the chamber upper portion 14a intermediate the ends of the latter slightly above the nozzles 62a. The outlets 32a are, moreover, in the FIG. 4 apparatus arranged to upwardly receive the clarified water at locations spaced outwardly of opposite sides of the lower end 22a. The apparatus of FIG. 4 is, however, in all other respects identical to the beforedescribed apparatus of FIG. 1; and the operation of the apparatus of FIG. 4 is believed to be apparent from the beforegoing description.

FIG. 5, wherein parts corresponding to those beforedescribed are designated by the similar reference numeral followed by the suffix b, illustrates an apparatus which represents another modified embodiment of the invention. In the apparatus of FIG. 5, the annular wall 78 peripherally bounding the lower section of the chamber upper portion 14a extends into the upper end of the chamber lower portion 18b spaced inwardly of the walls 34b, 36b by chambers 80, 82, respectively. In addition, the upper ends of the chambers 80, 82 communicate through openings 84, 86 with the chamber upper portion 14b intermediate the ends of the latter whereby the gaseous bubbles and bouyant solid material recovered in the chamber lower portion 18b are re-supplied to the chamber upper portion 14b intermediate the ends of the latter and slightly spaced below the nozzles 62b. The apparatus of FIG. 5 is, however, in all other respects identical to the beforedescribed apparatus; and the operation of the apparatus of FIG. 5 is believed to be apparent from the beforegoing description.

As shown in FIG. 6, wherein parts corresponding to those beforedescribed are designated by the similar reference numeral followed by the suffix c, the lower portion 18c of the clarifying chamber could be annular and substantially project laterally outwardly of all sides, rather than merely opposite sides, of the lower end of the chamber upper portion 14c. In this event, as illustrated in FIG. 6, the lower portion could be provided with a plurality of spaced apart liquid discharge outlets 32c each located to discharge liquid from the chamber lower portion 18c at a location spaced outwardly of the thereabove lower end of the chamber upper portion 14c; and the lower end of the chamber upper portion 14c would be spaced above the bottom of the chamber lower portion 18c a vertical distance sufficient that the area of the annular section of the chamber lower portion 18c directly below the annular wall bounding the lower end of the chamber upper portion 14c is greater than the area of such lower end.

Further alternatively, as shown in FIG. 7, wherein parts corresponding to those beforedescribed are designated by the similar reference numeral followed by the suffix d, the chamber lower portion 18d could project substantially laterally outwardly of only a single side of the chamber upper portion 14d, such side of the chamber portion 18d being provided with a liquid discharge outlet 32d similar in arrangement and location to a single one of the outlets 32. The lower end 22d is spaced above the bottom of the chamber lower portion 18d a vertical distance sufficient that the area of the chamber lower portion 18d below the side of the lower end 22d most adjacent to the outlet 32d, is, in a direction cross-wise to the flow of fluid outwardly therethrough, greater than the area of the lower end 22d. The apparatus of FIGS. 6 and 7 is, except as beforedescribed, identical to that of FIGS. 1–3; and the operation of the apparatus of FIGS. 6 and 7 is hence believed to be apparent from the beforegoing description.

From the preceding description it will be seen that the invention provides new and improved apparatus for clarifying an influent water. It will, moreover, be seen that the invention also provides new and improved methods for clarifying an influent water, which methods may, generally considered, comprise the steps of supplying the influent water into a clarifying chamber at a location spaced above the lower end of said clarifying chamber, supplying gaseous bubbles into said clarifying chamber at a second location spaced below said supply of the influent water, permitting the supplied gaseous bubbles to rise in said clarifying chamber and effect flotation separation of solid material in the supplied influent water while permitting liquid in said influent water to flow downwardly in said clarifying chamber below said supply of said gaseous bubbles, causing such downwardly flowing liquid to flow outwardly and the velocity of such liquid to be reduced, discharging such outwardly flowing liquid from said clarifying chamber below said supply of the gaseous bubbles and at a location spaced outwardly of the downward flow of liquid in said clarifying chamber above said supply of the gaseous bubbles, and discharging the flotation separated solid material from said clarifying chamber above said supply of the influent water thereto.

It will be also understood that the apparatus and methods of the invention may be employed both for clarifying an influent water, such as sewage, where clean water is the desired product, and also for clarifying a mineral/liquid, fiber/liquid, or other slurry, where solids recovery is of paramount interest.

Furthermore, it will be understood that, although only five embodiments of the invention have been illustrated and hereinbefore specifically described, the invention is not limited merely to these illustrated and described em-

What is claimed is:

1. Apparatus for clarifying an influent water, comprising a vessel containing a clarifying chamber including a first portion and a second portion adjacent the lower end of said first portion, said chamber second portion communicating with such lower end of said chamber first portion and said chamber second portion in at least one transverse direction being of greater dimension than such lower end and projecting laterally outwardly of at least one side of such lower end, influent water supply means operatively associated with said chamber first portion for supplying an influent water thereto at a location spaced above such lower end thereof, solid material discharge means operatively associated with said chamber first portion for discharging solid material from adjacent the upper end thereof, liquid discharge means operatively associated with said chamber second portion for discharging liquid from said chamber second portion at a location spaced outwardly of at least said one side of such lower end of said chamber first portion whereby liquid passing downwardly through such lower end flows outwardly in said chamber second portion to said liquid discharge means, the area of at least a section of said chamber second portion intermediate such lower end and said liquid discharge means, cross-wise to the flow of liquid outwardly through said chamber second portion to said liquid discharge means, being dimensioned relative to the area of such lower end to cause the velocity of the outwardly flowing liquid to be substantially reduced, gas supply means operatively associated with said clarifying chamber for supplying gaseous bubbles thereto at a location spaced vertically between said influent water supply means and said liquid discharge means, whereby such gaseous bubbles rise in said clarifying chamber to effect flotation of solid material to said solid material discharge means, and wall means overlying said chamber second portion laterally outwardly of such lower end of said chamber first portion for directing rising gaseous bubbles and buoyant solid material in said chamber second portion towards said chamber first portion for such flotation, said wall means causing said chamber second portion to progressively downwardly increase in dimension in said one transverse direction.

2. Clarifying apparatus according to claim 1, wherein said liquid discharge means is below the lower end of said chamber first portion, and said chamber second portion is in the lower end of said vessel.

3. Clarifying apparatus according to claim 1, wherein said chamber second portion projects outwardly of all sides of the lower end of said chamber first portion, and said liquid discharge means comprises means for discharging liquid from said chamber second portion outwardly of such lower end at a plurality of locations spaced around such lower end.

4. Clarifying apparatus according to claim 1, wherein said chamber second portion projects outwardly of at least two sides of such lower end of said chamber first portion, and said liquid discharge means comprises means for discharging liquid from said chamber portion at locations spaced outwardly of at least each of said two sides of such lower end.

5. Clarifying apparatus according to claim 1, further comprising means communicating the upper end of said chamber second portion with said chamber first portion intermediate the ends of the latter for supplying such rising gaseous bubbles and buoyant solid material from said chamber second portion to said chamber first portion intermediate its ends.

6. Clarifying apparatus according to claim 1, wherein such lower end of said chamber first portion extends into the upper end of said chamber second portion, and further comprising means communicating the upper end of said chamber second portion with said chamber first portion intermediate the ends of the latter for supplying such rising gaseous bubbles and buoyant solid material from such upper end to said chamber first portion intermediate its ends.

7. Clarifying apparatus according to claim 1, wherein said chamber second portion projects substantially outwardly of at least opposite sides of such lower end of said chamber first portion, said liquid discharge means comprises means for discharging liquid at locations spaced outwardly of at least each of said opposite sides of such lower end, said chamber second portion intermediate such open end and said liquid discharging means is dimensioned to cause the velocity of liquid flowing from such lower end through said chamber second portion to be reduced in the latter prior to discharge of the liquid by said discharging means, and said wall means overlies said chamber second portion on at least both of such opposite sides of such lower end and causes said chamber second portion to progressively downwardly increase in dimension in said one transverse direction on both of such opposite sides.

8. Clarifying apparatus according to claim 7, wherein said liquid discharging means are below such lower end of said chamber first portion.

9. Clarifying apparatus according to claim 7, wherein said chamber second portion projects outwardly of all sides of the lower end of said chamber first portion, and said liquid discharge means comprises means for discharging liquid from said chamber second portion outwardly of such lower end at a plurality of locations spaced around such lower end.

10. Clarifying apparatus according to claim 7, further comprising means communicating said upper end of said chamber second portion with said chamber first portion intermediate the ends of the latter for supplying the rising gaseous bubbles and buoyant solid material from said chamber second portion to said chamber first portion intermediate its ends.

11. Clarifying apparatus according to claim 7, wherein said chamber second portion is in the lower end of said vessel.

12. The method of clarifying an influent water in a clarifying chamber having a first portion and a second portion adjacent the lower end of said first portion of greater dimension than such lower end in at least one transverse direction and projecting laterally outwardly of at least one side of such lower end, said method comprising the steps of supplying the influent water into said chamber first portion at a location spaced above such lower end thereof, supplying gaseous bubbles into said clarifying chamber at a second location spaced below said supply of the influent water, permitting the supplied gaseous bubbles to rise in said clarifying chamber and effect flotation of solid material in said influent water while permitting liquid in said influent water to flow downwardly in said clarifying chamber, causing such downwardly flowing liquid to flow outwardly in said chamber second portion and the velocity of such outward liquid flow to be reduced, whereby gaseous bubbles and buoyant solid material accompanying such liquid flow are caused to rise in said chamber second portion, directing such rising gaseous bubbles and buoyant solid material to said chamber first portion, discharging such outwardly flowing liquid from said chamber second portion below said supply of the gaseous bubbles and at a location spaced outwardly of such lower end of said chamber first portion, and discharging the flotation separated solid material from adjacent the upper end of said clarifying chamber.

13. The method according to claim 12, wherein said gaseous bubbles are supplied to said chamber first portion adjacent to such lower end thereof.

14. The method according to claim 12, further comprising the step of supplying such rising gaseous bubbles and buoyant solid material from said chamber second portion to said chamber first portion at a location intermediate the ends of said chamber portion.

15. The method according to claim 12, wherein the liquid is discharged from adjacent the periphery of said chamber second portion.

16. The method according to claim 12, wherein the liquid is discharged from said chamber second portion at locations spaced outwardly of two sides of such lower end of said chamber first portion.

17. The method according to claim 16, wherein said two sides of such lower ends are opposite sides thereof.

References Cited
UNITED STATES PATENTS

| | | | |
|---|---|---|---|
| 3,642,618 | 2/1972 | Silva | 210—44 |
| 3,643,403 | 2/1972 | Speece | 261—Dig. 75 |
| 2,695,710 | 11/1954 | Gibbs | 210—44 |
| 2,874,842 | 2/1959 | Krofta | 210—44 |

SAMIH N. ZAHARNA, Primary Examiner

BENOIT CASTEL, Assistant Examiner

U.S. Cl. X.R.

210—221; 209—164, 168